United States Patent [19]

Meyer

[11] Patent Number: 4,845,855
[45] Date of Patent: Jul. 11, 1989

[54] INSTRUMENT FOR MEASURING VERTICAL DISTANCES

[76] Inventor: Hans Meyer, 24, rue du Bugnon, 1020 Renens, Switzerland

[21] Appl. No.: 187,276

[22] Filed: Apr. 28, 1988

Related U.S. Application Data

[63] Continuation of Ser. No. 930,701, Nov. 13, 1986, abandoned.

[30] Foreign Application Priority Data

Nov. 12, 1985 [CH] Switzerland .................. 4837/85

[51] Int. Cl.$^4$ .............................................. G01B 7/02
[52] U.S. Cl. ..................................................... 33/832
[58] Field of Search .................. 33/169 R, 170, 171, 33/172 R, 172 E

[56] References Cited

U.S. PATENT DOCUMENTS

| | | | |
|---|---|---|---|
| 2,996,806 | 8/1961 | Zieher | 33/143 R |
| 3,845,561 | 11/1974 | Elsdoerfer | 33/169 R |
| 4,276,696 | 7/1981 | Ernst | 33/169 R |
| 4,432,141 | 2/1984 | Marcyan | 33/169 R |

Primary Examiner—Harry N. Haroian
Attorney, Agent, or Firm—Gifford, Groh, Sheridan, Sprinkle & Dolgorukov

[57] ABSTRACT

A measuring instrument having a column 2 mounted on a base and a sliding unit 3 adapted for vertical displacement on said column 2. The sliding unit 2 has a housing 9 and a plate 10. The housing 9 is suspended on the column 2 by means of a cable 7 which is provided with a balancing weight. The plate 10 carrying a gauging element 5 is operatively connected by a counterweight device 17 to the housing 9. The counterweight device 17 has a lever 16 which is mounted on the housing 9. Lever 16 has a weight mounted on one end thereof. The other end of the lever 16 accommodates ball bearings 21 which serve to support plate 10 through cams 22. The instrument has a latching device 23 for establishing a zero position between plate 10 and housing 9 and for enabling adjustment of a measuring force. A damping device 26 interposed between plate 10 and housing 9 enables to cushion jolts occurring on the gauging member 5.

8 Claims, 2 Drawing Sheets

INSTRUMENT FOR MEASURING VERTICAL DISTANCES

This is a continuation of co-pending application Ser. No. 930,701 filed on Nov. 13, 1986, now abandoned.

The invention relates to an instrument for measuring vertical distances, including a column, a sliding unit arranged on said column, a gauging element and a height indicator.

Instruments have heretofore been provided wherein a sliding member is adapted for up and down movement on a column which is mounted on a base. This sliding member comprises a gauging element which is placed onto the object to be measured. The position assumed by the sliding member, and thus the measured value, is evaluated by an electronic measuring system and is displayed on an indicating device.

Normally, the sliding member is provided, by way of a bowden cable, with a counter weight so that its own weight does not interfere with the measuring procedure. The movement of the sliding member along the column is effected by a drive mechanism which is either arranged directly on the sliding member or is acting on the cable. The drive mechanism includes a device which enables to exert a predetermined pressure onto the sliding member, and this pressure is the pressure by which the gauging element secured to the sliding member is placed upon the object to be measured.

It is obvious that if one is to obtain optimum measuring accuracy, the pressure acting on the object to be measured must be kept at a low value. On the other hand, there does exist between the sliding member and the column a certain amount of friction and, in addition thereto, there is also the friction caused by the arrangement of the counterweight and the drive mechanism. This dictates that, in order to preclude measuring errors and to ensure satisfactory operation of the measuring instrument, the measuring pressure to be selected must be of a value that is considerably higher than the sum of these frictional values.

In an effort to resolve the above-mentioned problem it has been proposed that the sliding member be provided with a separate gauging instrument. Such gauging instruments are widely used in the field of gauging technology and are characterized by a low measuring pressure and a small gauging element. Due to the fact that it has become necessary to adapt the gauging elements to the specific measuring purpose, and since, on the other hand, these gauging inserts may have to be relatively heavy, this object cannot be easily met with the type of gauging instruments described above, because one of the problems is that the extra weight changes the characteristic of these instruments, and the other problem is that it is difficult to attach such inserts in a satisfactory manner to the small gauging instruments.

It is the object of the present invention to eliminate these disadvantages. This is accomplished in that the sliding member is comprised of two components which are adapted for movement relative to each other in the measuring direction, the arrangement being such that one first of these two components is mounted for vertical displacement on the column and the second components carries the gauging element and is connected with the first components by means of connecting elements which are provided with a counterweight device. This counterweight device is supported on the first component and balances the weight of the second component by means of a balancing weight.

Thus, the invention provides a measuring instrument which is able, while operating with low measuring pressures, to accommodate relatively heavy gauging elements, and wherein at the same time vibrations of these gauging elements during the movement of the sliding member are effectively eliminated.

One exemplary embodiment and one modified arrangement will be described in the following with reference being made to the attached drawings, wherein.

Figure 1:
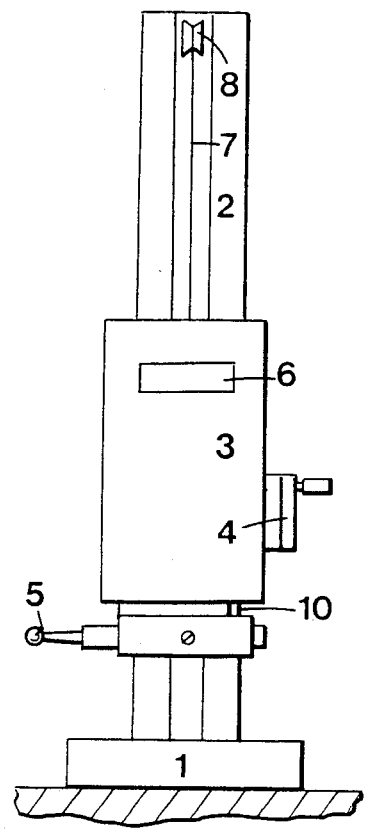
FIG. 1 is a schematic illustration of the measuring instrument.

As illustrated in FIG. 1, the measuring instrument is comprised of a base 1, a column 2 mounted to said base 1, and a sliding unit 3 adapted for sliding displacement on said column 2. Movement of the sliding unit 3 is effected through a drive mechanism 4 with a crank. The sliding unit 3 has secured thereto, by means of a plate 10, a gauging element 5 which is placed upon the object to be measured. The measuring result is picked up by an electronic sensing device and displayed in the window 6. The sliding unit 3 is provided with a cable 7 which extends via a pulley 8 to a counterweight (not illustrated) inside the column 2.

Figure 3:
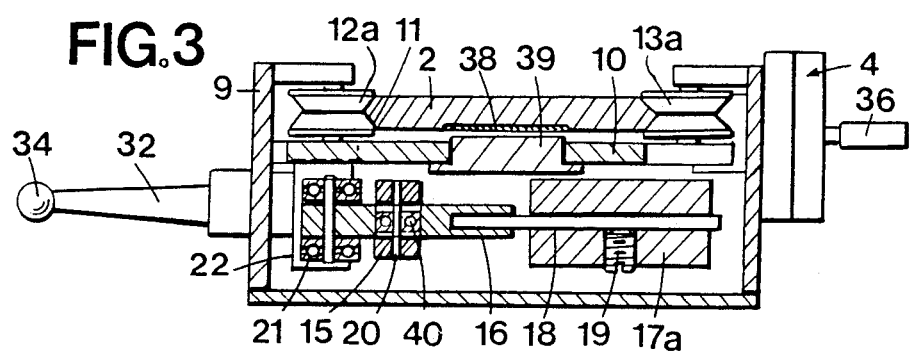
FIG. 3 is a cross-sectional view of FIG. 2 along line A—A.
Figure 2:
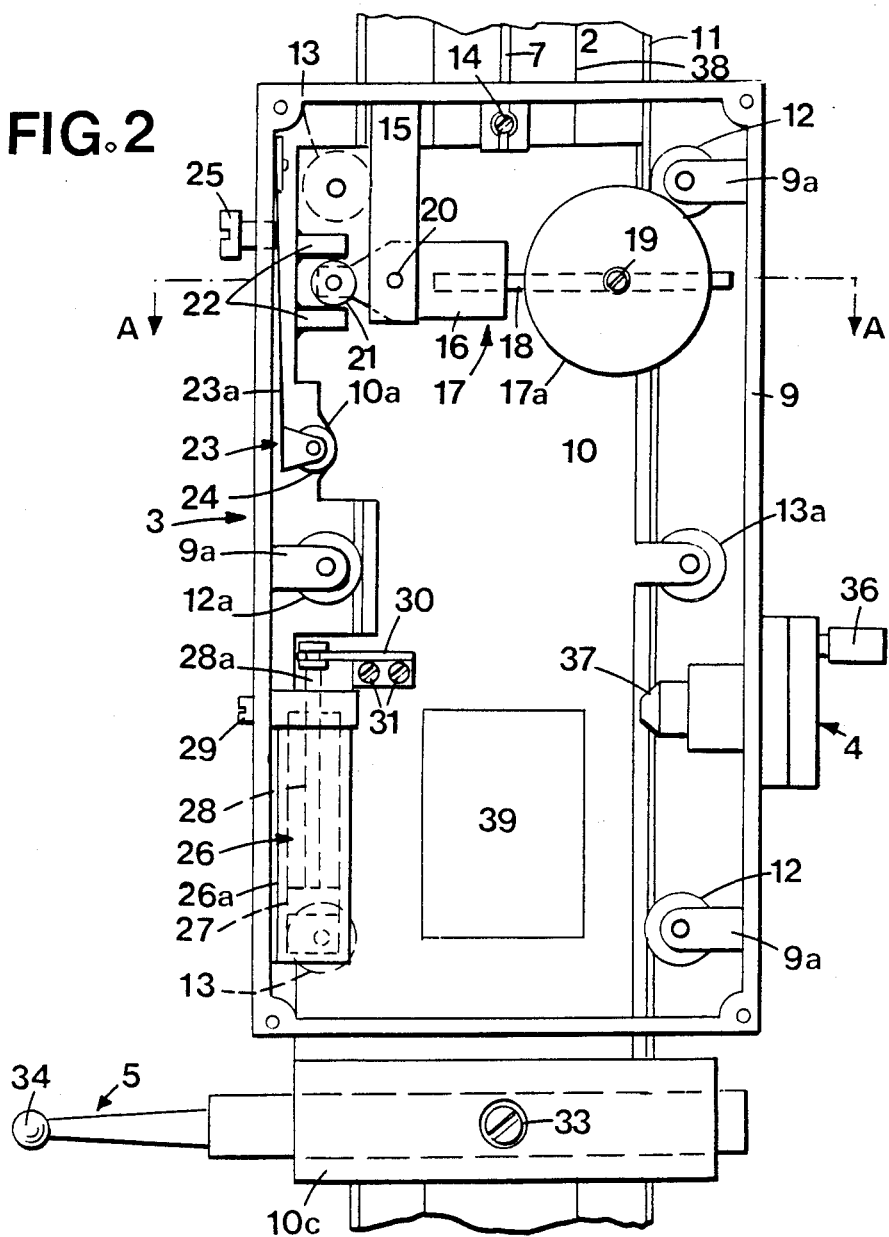
FIG. 2 is an illustration of the sliding unit.

FIG. 2 and 3 illustrate the inside of the sliding unit 3. The sliding unit is comprised of a first component referred to in the following as the housing 9, and a second component, namely the plate 10. Both components are mounted on a guide track 11 which is fastened to the column 2. Arms 9a serve as a support for rollers 12, 12a which are adapted for form locking movement on track 11. Plate 10 is also equipped with rollers which are designated by the numerals 13, 13a and which are also in engagement with track 11. In order to reduce friction, it is advisable that especially the rollers 13, 13a be mounted on ball bearings. Furthermore, in order to eliminate play it is preferable that the rollers 12a, 13a, which are disposed opposite the pair of rollers on the one side, be in spring-biased engagement with the track.

The entire slide unit is suspended on a cable 7 which is fastened to the housing 9 by means of a screw 14 and which is connected, as is usual, with a counterweight (not shown in the drawing).

A bracket 15, which is fastened to the housing 9, has mounted thereon by means of a ball bearing 40 a lever 16 which is adapted for pivoting movement about shaft 20 and which supports at one end 18 a weight 17a. The weight 17a is mounted for slidable movement on the lever 16 and is fixed in position by a screw 19. The other end of the lever 16 has arranged thereon ball bearings 21 which have the plate 10 bearing thereagainst. Thus, a counterweight device 17 is formed which is supported by the housing 9 and which serves to balance the weight of plate 10 by means of a counterweight 17a.

The measuring instrument also includes a latching device 23 for retaining the housing 9 and the plate 10 of the sliding member 3 in a zero position. This latching device 23 is comprised of a spring 23a which is secured to the housing 9 and which carries at its free end a roller 24. The roller 24 is adapted to latchingly engage into an indentation formed in the plate 10. The biasing force of the spring 23a is adjustable by means of a screw 25 disposed in the housing 9. The spring 23a is designed to provide that the roller 24 will retain the plate 10 in a zero position, which corresponds to the horizontal position of the lever when the same is in the state of equilibrium. The force acting on the arcuate portion 10a causes a force to be produced when the plate 10 is moved relative to the housing 9, and this force acts in opposition to the plate movement. This force, which is present at the end of the gauging element 34 in the form of the measuring pressure, can be adjusted by means of a calibrating screw 25.

A damping device 26 includes a cylinder housing 26a which is secured to the housing 9 by means of a threaded bolt 29, and a rod 28 having a piston 27 is movably mounted in the cylinder housing 26a. The upper rod end 28a is in engagement with a bifurcated member 30 which is fastened by means of screws 31 to the plate 10. The damping device 26 is designed to cushion the shocks which might be inadvertently imposed thereupon and to thereby prevent up and down swinging movements of the plate 10.

The gauging element 5 is mounted for sliding movement in a member 10c of plate 10 and is provided at its forward end with a ball 34. It can easily be interchanged with other types of gauging elements and be retained in position by means of a screw 33. The drive mechanism is mounted inside the housing 9 and comprises a frustoconical shaft end 37 which is operatively associated with the track 11. Turning of the crank 36 will effect up or down movement of the housing 9 on the track 11.

The measured value is picked up by one of various types of measuring systems. A measuring scale 38 which is embedded in the colume 2 is sampled by a pick-up device 39 disposed on the plate 10, and the signals are processed by a signal processing circuit (not shown), whereupon the measuring value is displayed in window 6 (FIG. 1).

As illustrated in FIG. 3, the lever 16 is mounted in anti-friction bearings 40 to keep frictional losses at a minimum.

Figure 4:
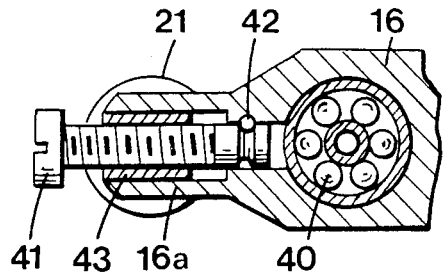
FIG. 4 is a cross-sectional view of one end of the balancing lever.

Since the weight of the gauging elements to be mounted in plate 10 may vary, means must be provided to compensate for these weight differences. This accomplished through adjustment of the weight 17a on the rod 18, or through changing the lever arm on which the ball bearings 21 is supported. If the latter procedure is chosen, a corresponding arrangement is illustrated in FIG. 4. Here, the ball bearings are arranged on a sleeve 43 which is adapted for displacement relative to the lever arm 16a by means of an adjusting screw 41. A pin 42 embedded in the lever 16 provides that the screw 41 remains axially fixed inside the lever 16. Preferably, the housing 9 is provided with an opening at the place where the screw is situated to enable access to the screw from outside the housing.

The counterweight device enables to keep the gauging pressure acting on the gauging element 5 attached forwardly of the plate 10 very low, because the friction caused by the suspension and the guide means can be kept within narrow limits. The latching device 23 enables to retain the plate 10 in a predetermined initial position and permits the measuring pressure to be calibrated to a desired value. Of course, one can also render the latching device inoperative in that the calibrating screw 25 is unthreaded to its outermost position.

The arrangement as described in the foregoing is also based on the following consideration: If the plate 10 were to be suspended in the housing on springs, it would vibrate any time it is adjusted from one position to another. This disadvantage is effectively eliminated by the invention. For instance, the invention provides that if the plate 10 has a tendency to stay behind when the housing is being moved upwardly, this tendency is being neutralized by the lever action of the weight 17a, with the result that the relative position of housing 9 and plate 10 remains unchanged. It is only when the plate, or rather the gauging element 5 connected therewith, is placed onto an object to be measured that the relative position between plate 10 and housing 9 is being changed.

Vibrations of plate 10 relative to housing 9 can occur only when the gauging organ is subjected to a jolt. This may happen when the gauging instrument is suddenly withdrawn from the object to be measured. In order to dampen the vibrations caused thereby, a damping device 26 is interposed between the plate 10 and the housing 9.

For the sake of simplicity, the guide means arranged on the track 11 serves to guide both the component 9 and the component 10. The resistance caused by the friction between the housing 9 and the guide means is negligible, whereas the friction for guiding the plate 10 is to be kept relatively low, and this objective is achieved through suitable anti-friction bearings.

Figure 5:
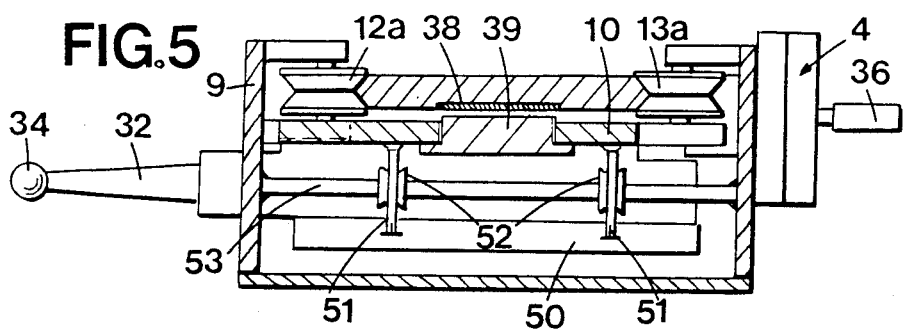
FIG. 5 is a cross-sectional view of a modified arrangement.

Instead of the pivoting lever 16 used in the embodiment described above, the embodiment illustrated in FIG. 5 is provided with a balancing weight 50 which is suspended on two cables 51. The cables 51 are guided by pulleys which are rotatably mounted on a shaft 53 attached to housing 9. The other end of the cables 51 is secured to the plate 10.

The instrument may be subjected to modifications within the scope of the inventio. For example, the plate 10 may be suspended, without the use of guide rollers, directly on the housing 9 by means of two or four pivoting arms, with the ends of the pivoting arms having arranged thereon corresponding balancing weights.

I claim:

1. An instrument for measuring a vertical distance, said instrument comprising:
   a column;
   a sliding unit having a first component and a second component, said first component movably mounted to said column, said first component being movable for vertical displacement along said column, said second component movably mounted to said first component,
   means for movably connecting said second component to said first component, said means for connecting comprising a counterweight and a connecting member, said connecting member having a first portion mounted to said second component and a second portion connected to said counterweight, said connecting member contacting said first component such that said counterweight, said connecting member and said second component are supported by said first component in a state of equilibrium in which the weight of said second component is balanced by said counterweight to dampen vibration during movement of the sliding unit;
   a gauging element mounted to said second component; and means for indicating the position occupied by said sliding unit on said column.

2. An instrument according to claim 1, wherein said connecting member is a lever having two arms, one arm of said lever being connected to said second component and an other arm mounted to said counterweight, such that the use of a suitable weight and lever ratio will enable the lever to be retained in a state of equilibrium.

3. An instrument according to claim 2, wherein said lever has an equilibrium position being affected by a change in length of at least one arm of said two arms of said lever.

4. An instrument according to claim 1, wherein said first and second components are mounted on a common guide element.

5. An instrument according to claim 1, comprising an elastic latching device for fixing a zero position, said elastic latching device being interposed between the first and second components.

6. An instrument according to claim 5, wherein said latching device comprises a spring-supported roller which is mounted on one of said first and second components of the sliding unit, and of an indentation provided on an other of said first and second components.

7. An instrument according to claim 1 comprising a vibration damping device interposed between said first and second two components of said sliding unit.

8. An instrument according to claim 1, wherein said means for connecting comprises: at least one cable, each said at least one cable having a pair of ends; and at least one pulley mounted to said first component, said counterweight being connected to one end said cable and said second component being secured to an other end of said cable.

* * * * *